United States Patent [19]

Bair

[11] Patent Number: 5,062,694

[45] Date of Patent: Nov. 5, 1991

[54] BIREFRINGENT FILTER DESIGN

[75] Inventor: Clayton H. Bair, Newport News, Va.

[73] Assignee: The United States of America as represented by the Administrator of the National Aeronautics and Space Administration, Washington, D.C.

[21] Appl. No.: 681,288

[22] Filed: Apr. 8, 1991

[51] Int. Cl.[5] .............................................. G02B 27/28
[52] U.S. Cl. .................................... 359/498; 372/105
[58] Field of Search .................. 372/105, 20; 350/400, 350/403, 404

[56] References Cited

U.S. PATENT DOCUMENTS

| 3,872,402 | 3/1975 | Sanchez | 331/94.5 |
|---|---|---|---|
| 4,269,481 | 5/1981 | Yeh et al. | 350/356 |
| 4,569,053 | 2/1986 | Roullard, III et al. | 372/20 |
| 4,678,287 | 7/1987 | Buhser | 350/404 |
| 4,698,816 | 10/1987 | Chun | 372/19 |
| 4,914,664 | 4/1990 | Woodward | 372/105 |
| 4,987,567 | 1/1991 | Buhser | 350/404 |

Primary Examiner—James W. Davie
Attorney, Agent, or Firm—Kevin B. Osborne

[57] ABSTRACT

A birefringent filter is provided for tuning the wavelength of a broad band emission laser. The filter comprises thin plates of a birefringent material having thicknesses which are non-unity, integral multiples of the difference between the thicknesses of the two thinnest plates. The resulting wavelength selectivity is substantially equivalent to the wavelength selectivity of a conventional filter which has a thinnest plate having a thickness equal to this thickness difference. The present invention obtains an acceptable tuning of the wavelength while avoiding a decrease in optical quality associated with conventional filters wherein the respective plate thicknesses are integral multiples of the thinnest plate.

4 Claims, 4 Drawing Sheets

BIREFRINGENT FILTER DESIGN

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Technical Field of the Invention

The present invention relates generally to wavelength selectivity in broad band emission lasers and more particularly to an improved multiple plate stack for a birefringent filter to achieve such wavelength selectivity.

2. Discussion of the Related Art

Some lasers, notably dye lasers and some solid-state lasers, offer wide frequency tunability. For many applications such as atmospheric remote sensing, a single well defined wavelength within the continuous spectral output range must be selected. Unless some type of wavelength selective element is provided with wide band lasers, the laser will operate across a wide wavelength interval. Wavelength selective elements currently in use include birefringent filters, prisms, etalons, and gratings. Techniques involving the use of these conventional elements are well developed and many commercially available lasers are supplied with one or more line narrowing/wavelength selective components.

The tuning range of current birefringent filter designs is limited by the thickness of the thinnest plate, which must exceed a few hundred micrometers to maintain good optical quality. Conventional birefringent filters capable of spanning the entire tuning range of emerging wide band vibronic solid-state lasers require fabrication of extremely thin plates which could result in questionable optical quality.

The typical birefringent filter consists of several plates fabricated from an optical material that exhibits double refraction or birefringence. Polarized light incident on one surface of a single plate is split into ordinary and extraordinary components which travel through the material at different velocities. When these components recombine on the opposite surface of the plate, the net difference between the phases of the ordinary and extraordinary rays causes the resultant beam to have a different polarization from the incoming beam. Because losses depend on angles and polarizations, the emerging beam also has a different amplitude from the incoming beam.

Wavelength selectivity is possible with the typical birefringent filter because the outgoing beam of light is identical to the incoming beam at some values of the net phase difference. See, e.g., U.S. Pat. No. 4,569,053 to Roullard, III, et al. A series of plates having different thicknesses give the necessary flexibility to achieve high losses at all but a few wavelengths. These highly transmitted wavelengths are tunable by varying the angle of the incoming beam with respect to the optical axis of the material. The thicknesses of the thicker plates are normally integral multiples of the thickness of the thinnest plate. The usual method of increasing the wavelength separation between the highly transmitted waves is to fabricate thinner plates, which leads to a degradation in optical quality as discussed above.

OBJECTS OF THE INVENTION

It is accordingly an object of the present invention to increase the wavelength selectivity in broad band emission lasers.

It is another object of the present invention to increase the wavelength separation between highly transmitted peaks in a birefringent filter comprising several plates.

It is a further object of the present invention to achieve the foregoing objects without a decrease in the optical quality of the thinnest plate in the filter.

It is yet another object of the present invention to increase the thickness of the thinnest plate in a particular birefringent filter to increase optical quality while maintaining the particular wavelength separation and tunability of the filter.

Additional objects and advantages of the present invention are apparent from the specification and drawings which follow.

SUMMARY OF THE INVENTION

The foregoing and additional objects are obtained by the birefringent filter design according to the present invention. Each of the plates is fabricated with a thickness which is an non-unity, integral multiple of the difference between the thicknesses of the two thinnest plates. The resulting wavelength selectivity of such a filter is substantially equal to the wavelength selectivity of a filter which has a thinnest plate with a thickness equal to this thickness difference. Accordingly, the present invention obtains acceptable tuning of the wavelength while avoiding the decrease in optical quality associated with very thin plates.

DETAILED DESCRIPTION OF THE PREFERRED EMBODIMENT

Figure 1:
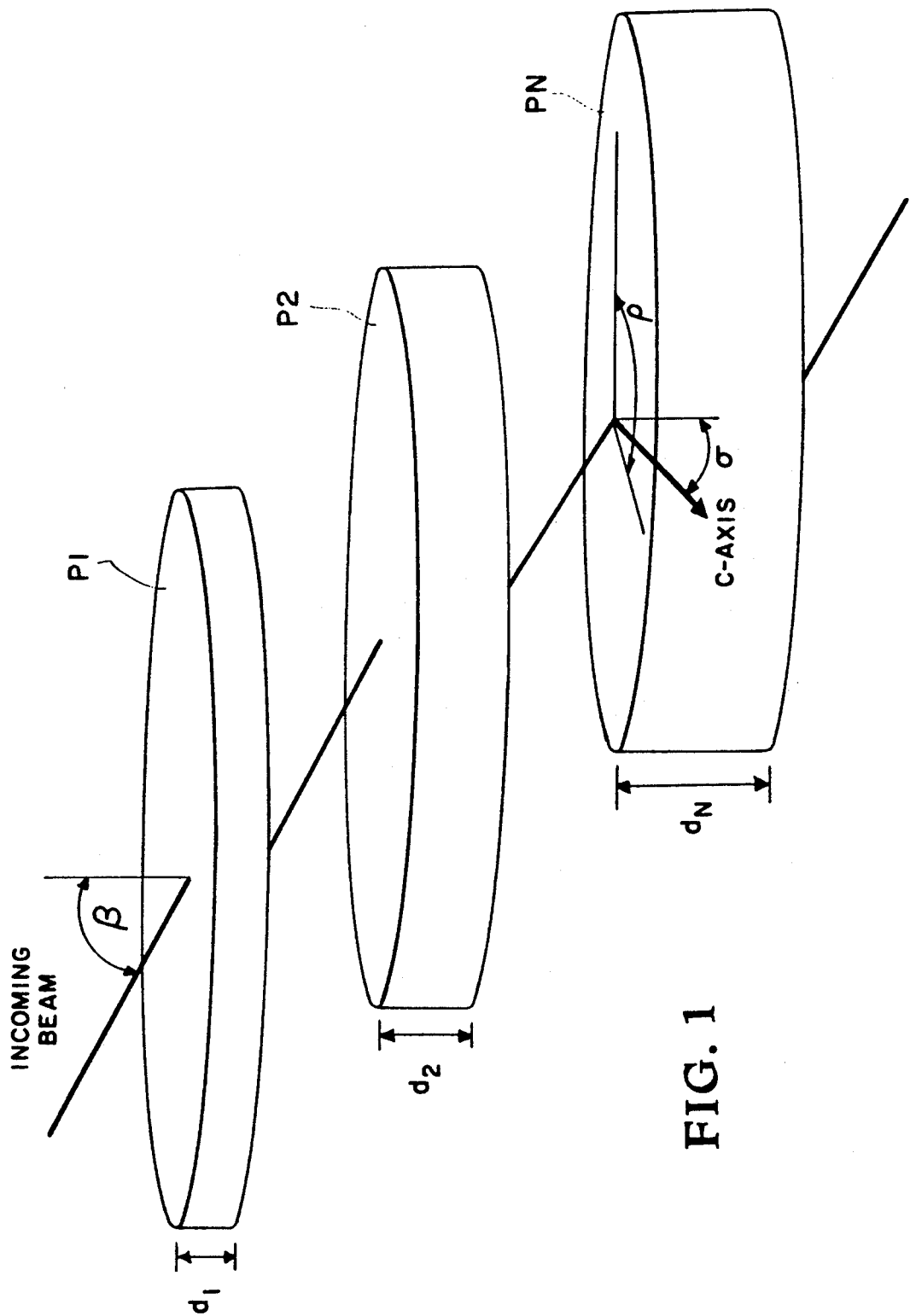
FIG. 1 is a schematic of a multi-element birefringent filter.

Referring now to FIG. 1, a conventional birefringent filter is schematically shown consisting of several plates, P1, P2, and PN fabricated from an optical material which exhibits double refraction or birefringence, e.g., a uniaxial crystal. A polarized light ray incident onto the surface of a single plate will be split into ordinary and extraordinary components which travel at different velocities in the material resulting in a net phase difference between the waves. When these waves recombine at the exit face of the plate, the resulting beam, in general, has a different amplitude and polarization from the incoming beam. The amount of phase delay accumulated while traversing the plate, and hence the tuning characteristics of the plate, depends on the type of material, wavelength of the incident light, and the geometric parameters indicated in FIG. 1. The angle of incidence, $\beta$, is usually chosen to be Brewster's angle so that incident p-polarized radiation will enter the filter without loss. The rotation angle, $\rho$, is the angle between the projection of the crystal c-axis onto the plate surface and the plane of incidence and is defined such that when $\rho = 0$ the c-axis is in the incident plane. The angle between the c-axis and the plate surface normal is $\sigma$.

The phase delay for a single plate $P_1$ of thickness $d_1$ is given by $$\Delta\phi = \frac{2\pi d_1}{\lambda} [n_1 \cos\beta_1 - n_o \cos\beta_o] \tag{1}$$

where $\lambda$ is the wavelength of the incident radiation, $n_o$ and $n_1$ are the indices of refraction of the ordinary and extraordinary components respectively, and $\beta_o$ and $\beta_1$ are the internal angles of refraction, measured with respect to the plate surface normal, of the ordinary and extraordinary components respectively. The determination of the index of refraction of the extraordinary ray, $n_1$, is achieved by simultaneously satisfying the following equations $$\sin\beta_1 = \frac{\sin\beta}{n_1} \tag{2}$$

$$\cos\gamma = \cos\rho \sin\sigma \sin\beta_1 + \cos\beta_1 \cos\sigma \tag{3}$$

$$\frac{1}{n_1^2} = \frac{\sin^2\gamma}{n_e^2} + \frac{\cos^2\gamma}{n_o^2} \tag{4}$$

where $n_e$ is the primary extraordinary index of refraction. The angle $\gamma$ is the angle between the direction of propagation of the extraordinary ray in the material and the optic axis. Since the analytical solution for $n_1$ to the system of equations (2-4) is cumbersome, an iterative approach, in which $n_1$ is replaced by $n_e$ in equation (2) as the initial approximation, can be used. This iterative solution converges very rapidly to the desired solution.

Using the Jones matrix formalism a matrix, M, is defined $$M = \tag{5}$$

$$\begin{bmatrix} p^2(\cos^2\alpha + \exp(-i\Delta\phi)\sin^2\alpha) & pq\sin\alpha\cos\alpha(1 - \exp(-i\Delta\phi)) \\ pq\sin\alpha\cos\alpha(1 - \exp(-i\Delta\phi)) & q^2(\cos^2\alpha + \exp(-i\Delta\phi)\sin^2\alpha) \end{bmatrix}$$

where $p^2$ and $q^2$ are the transmittances of the p-polarized and s-polarized components of the incident flux through the plate. If $\beta$ is equal to Brewster's angle, then $p=1$. The angle, $\alpha$, is the angle between the plane of incidence and the plane containing the optic axis and the extraordinary ray and is given by $$\sin\alpha = \frac{\sin\sigma \sin\rho}{\sin\gamma} \tag{6}$$

To obtain the Jones matrix for a set of N plates comprising the filter, it is necessary to multiply matrices representing individual plates in the order in which they are traversed. For a single pass of the filter as in a ring resonator, $$M = M_N \ldots M_2 M_1 \tag{7a}$$

and for a double pass as in a Fabry-Perot resonator or in an external feedback arm of a ring resonator, $$M = M_1 M_2 \ldots M_N M_N \ldots M_2 M_1. \tag{7b}$$

The emerging field, $E_{out}$, after traversing a multi-element birefringement filter, is given in terms of the input field, $E_{in}$, by $$E_{out} = M E_{in} \tag{8}$$

where $$E_{out} = \begin{bmatrix} E_{p,out} \\ E_{s,out} \end{bmatrix} \text{ and } E_{in} = \begin{bmatrix} E_{p,in} \\ E_{s,in} \end{bmatrix}.$$

The components $E_p$ and $E_s$ are the p- and s-polarized components of the electric field defined with respect to the plane of incidence. In laser applications it is frequently desirable to find that field which is replicated after traversing the birefringent filter with only a change in amplitude, that is, the eigenpolarizations of the resonator. In this case, the eigenvalue equation $$ME = tE \tag{9}$$

must be solved, in which the eigenvalues, t, are in general complex and $|t|^2$ gives the energy transmitted in a single traversal of the filter represented by the matrix M.

Maximum transmission through a single plate occurs at those wavelengths for which the phase delay given by equation (1) is an integral multiple of $2\pi$. For some orientation of the plate there will be a transmission maximum at wavelength $\lambda$ identified by the integer order $m_i$ given by $$m_i = \frac{d_i}{\lambda} [n_1 \cos\beta_1 - n_o \cos\beta_o] = d_i f(\lambda) \tag{10}$$

where $d_i$ is the thickness of the ith plate. The function, $f(\lambda)$, includes the wavelength dependent qualities. Assuming that the plates in a multi-element birefringent filter are properly oriented and are identical with the exception of thickness only, there will be some wavelength for which equation (10) is simultaneously satisfied for all plates, provided that their thicknesses are integral multiples of some base thickness. That is, $$d_i = I_i d_o \tag{11}$$

where $I_i$ is an integer and $d_o$ is the base thickness (i.e., $I_o = 1$). For convenience, label the plates such that $d_o < d_1 < d_2 \ldots < d_N$. In general, the width of the peaks is governed by $d_N$, while the separation between maximally transmitted peaks is controlled by $d_o$.

The behavior of the transmission spectrum of the filter will be considered as if the plate with thickness $d_o$ is excluded from the set of plates. Assume only that $d_o$ and the corresponding $d_i$s are chosen such that the integers $I_1$ through $I_N$ have no common integer factors other than unity. From equations (10) and (11), the following is derived:

$$m_1 = I_1 d_o f(\lambda), \ldots, m_N = I_N d_o f(\lambda) \tag{12}$$

and $$m_1' = I_1 d_o f(\lambda'), \ldots, m_N' = I_N d_o f(\lambda') \quad (13)$$

where the primes are used to differentiate between the wavelengths and corresponding orders for differing maximum transmission peaks for a fixed orientation. The symbol $\mu_o$ is defined such that $$\mu_o = d_o f(\lambda) \quad (14)$$

where $\mu_o$ is not a priori integral since a plate of thickness $d_o$ is not included in the multi-element filter. However, since $\mu_o = m_k/I_k$ ($1 \leq k \leq N$), it is rational and, in fact, can be shown to be integral under the condition stated above. From equations (12) and (14) $m_k = I_k \mu_o$ for all $1 \leq k \leq N$. If $\mu_o$ is expressed as a fraction, the denominator could exactly divide some, but not all, of the $I_k$ since they were assumed to have no common integer factors. Therefore, the denominator of $\mu_o$ must be unity and $\mu_o$ can be replaced in equation (14) by $m_o$, where $m_o$ is an integer.

To investigate the separation between maximally transmitted wavelengths, equations (12)–(14) can be solved for $d_o[f(\lambda) - f(\lambda')]$ and similar terms equated for plates 1 and N to obtain $$\frac{m_1 - m_1'}{I_1} = \frac{m_2 - m_2'}{I_2} = \ldots = \frac{m_N - m_N'}{I_N} = m_o - m_o' \quad (15)$$

where $m_o' = d_o f(\lambda')$. This is just the condition that would be obtained if the plate with thickness $d_o$ were included in the filter. The smallest separation occurs when $m_o - m_o' = 1$. That is, a filter having a separation between maximally transmitted peaks corresponding to a plate with thickness $d_o$ can be designed without actually having to fabricate the thin plate: it is necessary only that $d_o$ be the greatest common divisor of $d_I$ through $d_N$. This can be an advantage when designing tuning elements for broadly tunable lasers, in which very thin plates may be desired to achieve the required tuning range.

Figure 2:
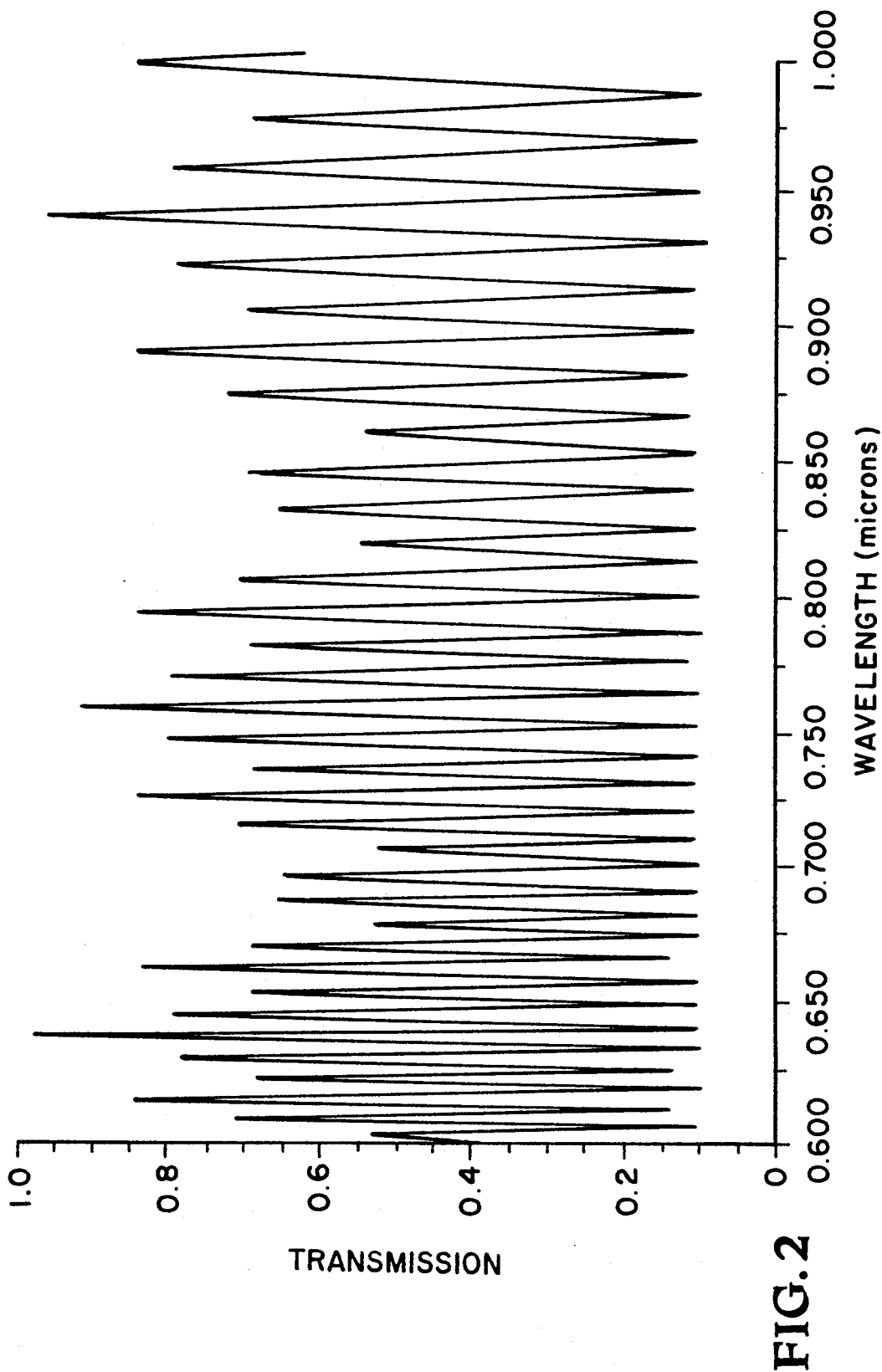
FIG. 2 is a graph of the calculated p-polarized component of a transmission through a three plate birefringent filter, assuming p-polarized input.
Figure 3:
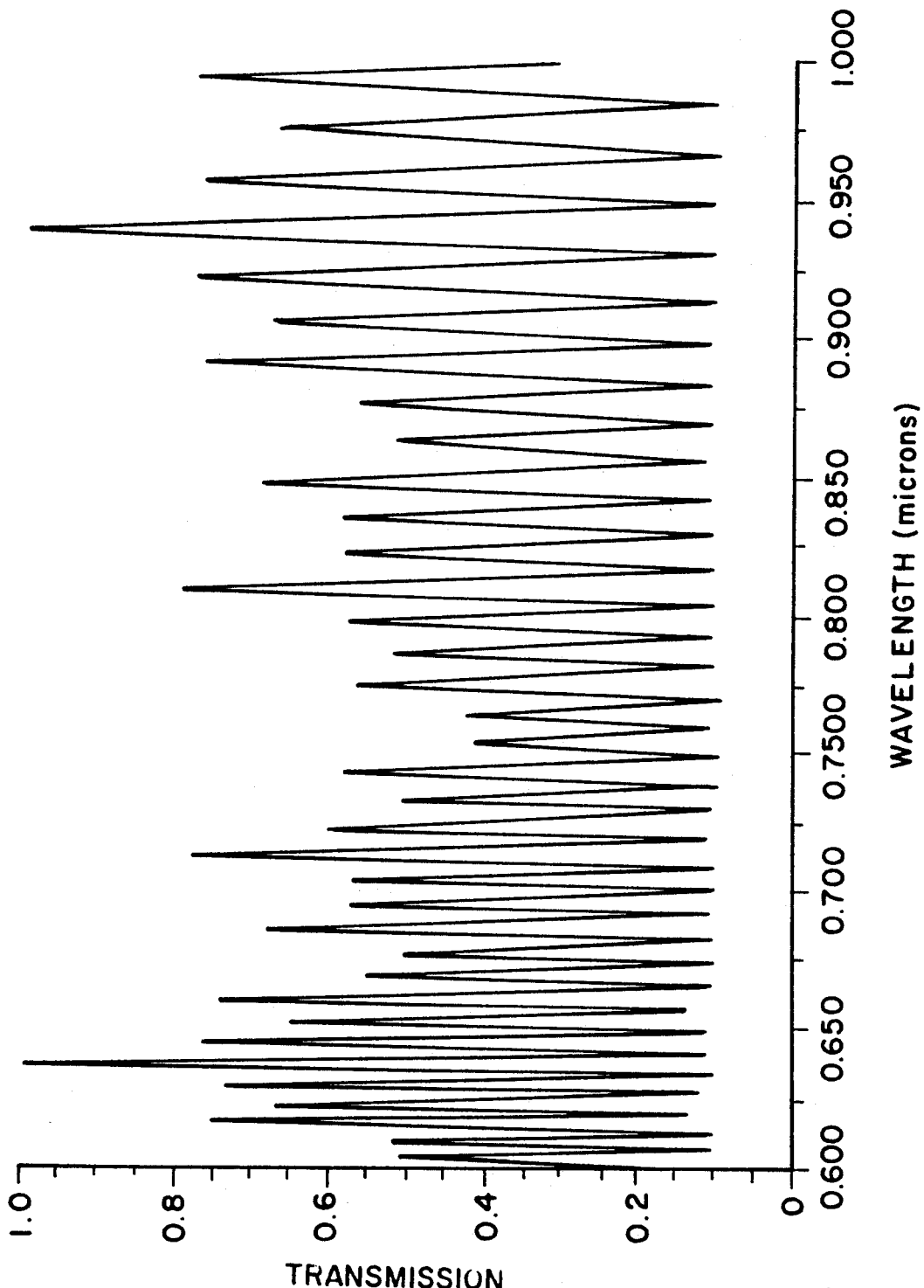
FIG. 3 is a graph of the calculated p-polarized component of a transmission through a four plate birefringent filter, assuming p-polarized input.
Figure 4:
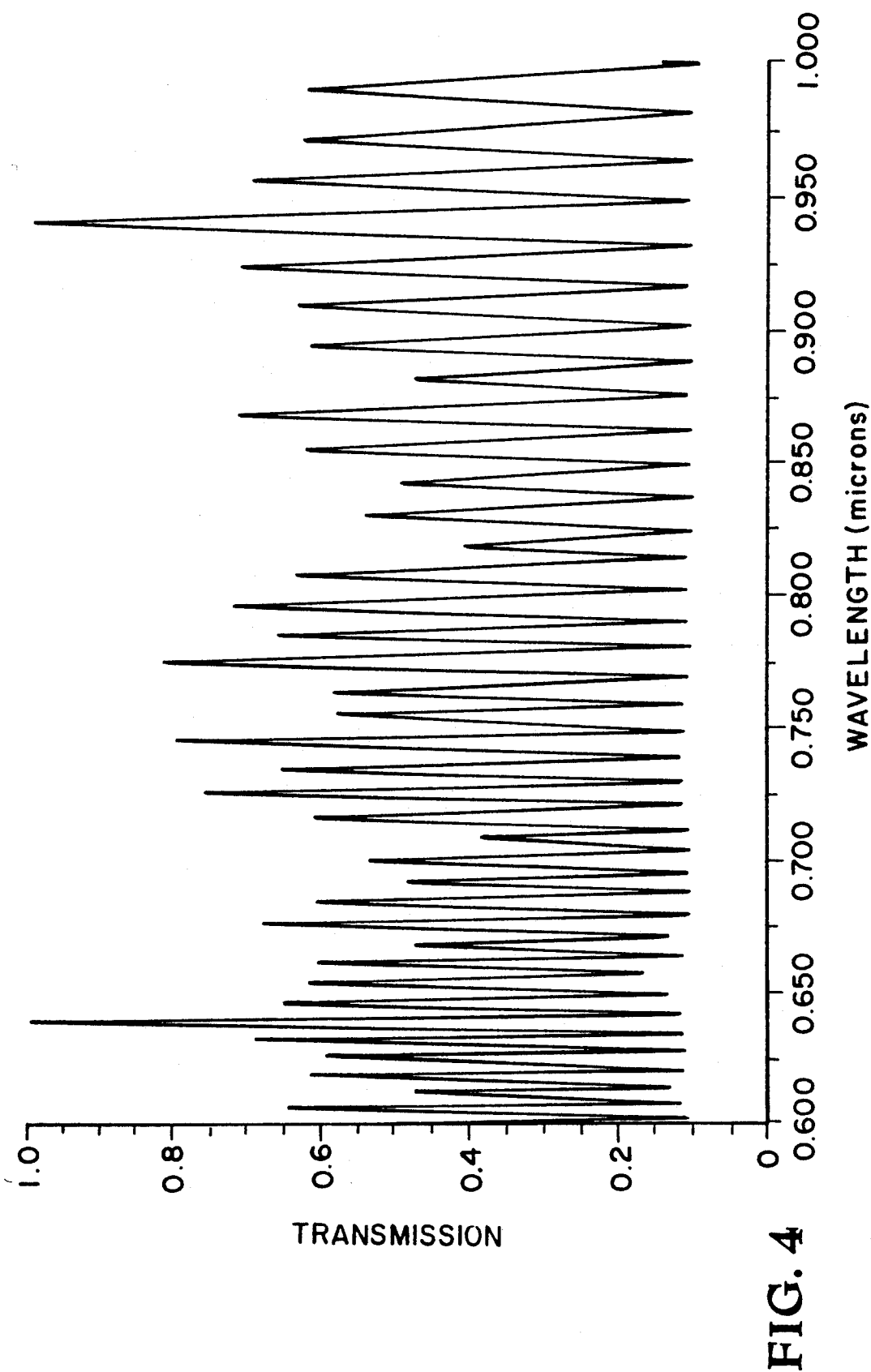
FIG. 4 is a graph of the calculated p-polarized component of a transmission through a four plate birefringent filter having different plate thicknesses from the embodiment of FIG. 3, assuming p-polarized input.

FIGS. 2–4 show the calculated fractional intensity of p-polarized light emerging from a filter, $I_p$, where $$I_p = E_{p,out} E^*_{p,out} \quad (16)$$

and incident normalized p-polarized radiation has been assumed. In these Figures, the respective parameters are:

FIG. 2: calculated p-polarized component of the transmission through a three plate birefringent filter assuming p-polarized input. Orientation of the plate is given from $\sigma = 35°$, $\rho = 120°$, and $\beta = 57°$. Plate thicknesses are 0.50 mm, 1.5 mm, and 4.5 mm.

FIG. 3: calculated p-polarized component of the transmission through a four plate birefringent filter assuming p-polarized input. Orientation of the plate is given from $\sigma = 35°$, $\rho = 120°$, and $\beta = 57°$. Plate thicknesses are 0.25 mm, 0.50 mm, 1.5 mm, and 4.5 mm.

FIG. 4: calculated p-polarized component of the transmission through a four plate birefringent filter assuming p-polarized input. Orientation of the plate is given from $\sigma = 35°$, $\rho = 120°$, and $\beta = 57°$. Plate thicknesses are 0.50 mm, 0.75 mm, 1.5 mm, and 4.5 mm.

The emerging field was calculated from (8) with M given by (7a). The plates comprising the filter are assumed to be fabricated from quartz. In FIG. 2, the c-axis is inclined at 35° with respect to the surface normal, the tuning angle $\rho$ is 120°, and the base thickness is 0.50 mm. The plate thicknesses are in the ratio $I_1:I_2:I_3 = 1:3:9$. These plate ratios are thus determined by the standard method wherein the thicknesses of the thicker plates are integral multiples of the thickness of the thickness of the thinnest plate. This conventional filter, which is nominally designed to be used with Ti:sapphire laser, has three transmission maxima, e.g., approximately 630 nm, 760 nm, 940 nm, within the gain bandwidth of Ti:sapphire. Since the wavelength at which the laser will oscillate is established by the net resonator gain, the output coupler reflectivity and emission spectra play important roles in determining which of the three transmission peaks would provide the tuned output. However, since the stimulated emission coefficient for Ti:-sapphire is much greater at 760 nm than at, say 940 nm, it could be difficult to entirely suppress emission at 760 nm with mirrors optimally coated for 940 nm operation.

To obtain the required suppression near the emission maximum, it would be desirable to design a filter with a transmission spectrum of the type shown in FIG. 3. In FIG. 3 the plate ratios are 1:2:6:18 with a base thickness of 0.25 mm with the remaining parameters the same as in FIG. 2. As can be seen in FIG. 3, the peak at 760 nm has been removed by the inclusion of the 0.25 mm birefringent plate in the conventional manner. It is difficult, however, to fabricate such thin plates while maintaining the optical quality necessary for laser applications.

FIG. 4 illustrates the teachings of the present invention by which the peak near 760 nm can be removed without fabricating the 0.25 mm plate and suffering a decrease in optical quality. The parameters for FIG. 4 are identical to those of FIGS. 2 and 3 with the exception that the plate thicknesses are in the ratio $I_1:I_2:I_3:I_4 = 2:3:6:18$ with $d_o = 0.25$ mm. In other words, each plate has a respective thickness which an integral multiple of the difference in thickness between the two thinnest plates (0.75 mm − 0.50 mm = 0.25 mm in this example) and the plates are stacked such that light passes through the thinnest to the thickest plate. The integral multiple is any positive integer not equal to one, i.e., a non-unity integer. The thinnest plate has thickness $d_1 = 0.50$ mm which is much thicker, and therefore has better optical qualities, than the 0.25 mm thickness of the thinnest plate in the FIG. 3 embodiment. The peak near 760 nm has again been removed without significant degradation of the remainder of the transmission spectrum. A filter of the type shown in FIG. 4 has been fabricated and used to tune a titanium doped sapphire laser. The performance characteristics of the tuner were as expected from the preceding analysis. For many applications involving the use of wideband tunable vibronic lasers, the elimination of the extremely thin plate could improve the optical reliability of the resonator.

The foregoing specific values for the plate thickness, number of plates, and integral multiples are of course by way of example only. The skilled artisan can employ the filter of the present invention to obtain the desired tunability without departing from the invention.

The algorithm to model the performance of a birefringent filter described in this application has been implemented on desk-top computer equipped with the DOS operating system, am 8087 math co-processor chip and a Fortran compiler. Special features of the model allow the user to investigate the effects of thermal instabilities and mechanical misalignment for filters of up to twelve optical elements. The filter elements may be birefringent plates, waveplates or polarizers. The algorithm is publicly available through the NASA COSMIC software library by contacting COSMIC, University of Georgia, Athens, Ga., 30602 and requesting LAR 13945, "Birefringent Filter Model."

Many improvements, modifications and substitutes will become apparent to one of skill in the art without departing from the spirit and scope of the present invention as described in the specification and defined in the following claims.

What is claimed is:

1. A birefringent filter comprising:
a plurality of N plates of an optical material exhibiting birefringence, each of said plates having a respective thickness $d_1, d_2 \ldots d_N$, wherein $d_1 < d_2 \ldots < d_N$, the respective thicknesses $d_1 \ldots d_N$ are non-unity, integral multiples of the difference in thickness between $d_1$ and $d_2$, and the plates are stacked such that light to be filtered passes in order through the plates having respective thicknesses of $d_1, d_2 \ldots d_N$.

2. A birefringent filter comprising:
a first birefringent plate having a thickness $d_1$;
a second birefringent plate having a thickness $d_2$; and
a third birefringent plate having a thickness $d_3$,
wherein $d_1 < d_2 < d_3$ and $d_1, d_2,$ and $d_3$ are non-unity, integral multiples of the difference in thickness between $d_1$ and $d_2$, and the birefringent plates are stacked such that light to be filtered passes in order through the first, second and third birefringent plates.

3. The birefringent filter according to claim 2, further comprising a fourth birefringent plate having a thickness $d_4$ which is greater than $d_3$, wherein $d_4$ is an integral multiple of the difference in thickness between $d_1$ and $d_2$, and wherein the fourth birefringent plate is stacked such that light to be filtered passes in order through the first, second, third and fourth plates.

4. A method of filtering light comprising the steps of:
providing a plurality of N plates of an optical material exhibiting birefringence, each of said plates having a respective thicknesses $d_1, d_2 \ldots d_N$, wherein $d_1 < d_2 \ldots < d_N$, and the respective thicknesses $d_1, d_2 \ldots d_N$ are non-unity, integral multiples of the difference in thickness between $d_1$ and $d_2$; and
stacking said plurality of N plates such that the light to be filtered passes in order through the plates having respective thicknesses of $d_1, d_2, \ldots d_N$.

* * * * *